United States Patent [19]

Van Beek

[11] Patent Number: 5,052,822
[45] Date of Patent: Oct. 1, 1991

[54] AXIAL BEARING COMPRISING A RESERVOIR WITH A PATTERN OF FEED GROOVES

[75] Inventor: Anton Van Beek, Dordrecht, Netherlands

[73] Assignee: U.S. Philips Corporation, New York, N.Y.

[21] Appl. No.: 220,924

[22] Filed: Jul. 18, 1988

Related U.S. Application Data

[63] Continuation of Ser. No. 59,972, Jun. 8, 1987, abandoned.

[30] Foreign Application Priority Data

Jun. 6, 1986 [NL] Netherlands ............ 8601464

[51] Int. Cl.$^5$ ............................................. F16C 17/08
[52] U.S. Cl. ............................................. 384/123
[58] Field of Search .............. 384/369, 123, 118, 121, 384/124

[56] References Cited

U.S. PATENT DOCUMENTS 3,376,083 4/1968 Muijderman ............... 384/123
3,870,382 3/1975 Reinhoudt ............... 384/123
4,558,909 12/1985 Stauber ............... 384/123

OTHER PUBLICATIONS

Philips Technisch Tijdschrift, vol. 25, No. 9, pp. 296–316 (1963).

Primary Examiner—Lenard A. Footland
Attorney, Agent, or Firm—Brian J. Wieghaus

[57] ABSTRACT

An axial hydrodynamic bearing having two parts which are rotatable relative to each other about an axis of rotation comprises a first surface and a second surface facing the first surface. The first surface is formed with one or more patterns of bearing grooves which in the case of a rotation of the surfaces relative to each other act to build up pressure in a lubricant which is present between the surfaces during operation. A reservoir for the lubricant is present between the first surface and the second surface, one of the surfaces being formed with a pattern of feed grooves at the location of the reservoir, which pattern is situated in an annular area which is concentric with the axis of rotation, to pump lubricant towards the pattern of bearing grooves operation.

30 Claims, 1 Drawing Sheet

AXIAL BEARING COMPRISING A RESERVOIR WITH A PATTERN OF FEED GROOVES

This is a continuation of application Ser. No. 059,972, filed June 8, 1987, now abandoned.

BACKGROUND OF THE INVENTION

The invention relates to an axial bearing comprising two parts which are rotatable relative to each other about an axis of rotation, comprising a first surface and a second surface facing the first surface, said first surface being provided with at least a pattern of bearing grooves, which pattern, as the surfaces rotate relative to each other, acts to build up a pressure in a viscous medium present in a gap formed between the two surfaces during operation.

Such an axial bearing is known from Netherlands Patent Application 7,213,192 to which U.S. Pat. No. 3,870,382 coresponds, herewith incorporated by reference. In the known bearing two patterns of bearing grooves are formed, which patterns produce opposed pressures in the viscous medium between the bearing surfaces during a rotary movement of one part relative to the other part, which medium may be a liquid lubricant such as oil or grease. For a correct operation of the bearing it is necessary that under operating conditions there is always an adequate amount of lubricant between the surfaces, in particular at a location of the bearing grooves. Since in practice there is always some loss of viscous medium, for example as a result of leakage and evaporation, the known bearing will have lost such an amount of viscous medium after some time that it is no longer possible to build up an adequate pressure, which renders the bearing unreliable and hence not suitable for further use.

SUMMARY OF THE INVENTION

It is the object of the invention to improve an axial bearing of the type defined in the opening paragraph in such a way that the period during which the bearing can be used reliably is extended considerably.

To this end the axial bearing in accordance with the invention is characterized in that a reservoir for the viscous medium is provided between the first surface and the second surface, at the location of which reservoir one of the surfaces is formed with a pattern of feed grooves, which pattern is situated in an annular area which is concentric with the axis of rotation, the feed grooves pumping the viscous medium towards the pattern of bearing grooves during operation.

In the axial bearing in accordance with the invention the pressure build-up in the viscous medium during rotation of one part relative to the other part provides an effective hydrodynamic lubrication. The viscous medium may be oil or grease. In order to sustain the hydrodynamic action said gap between the surfaces is constantly supplied with an adequate amount of viscous medium during operation. This is achieved by means of the feed grooves which pump the viscous medium from the reservoir towards the bearing grooves during operation, the reservoir being filled with an extra amount of viscous medium during or after manufacture of the bearing.

Therefore, the axial bearing in accordance with the invention has the advantage that there is a provision which ensures that the amount of viscous medium lost from the bearing as a result of leakage, evaporation or otherwise is replenished with viscous medium from the reservoir for a long period and which also ensures that the viscous medium in the reservoir is duly fed into the gap. Therefore, the bearing in accordance with the invention is very suitable for uses where a long period of reliable operation is required.

It is to be noted that from Netherlands Patent Application 6,503,950 to which U.S. Pat. No. 3,376,083 corresponds, herewith incorporated by reference, an axial bearing for a rotatable shaft is known, which bearing is provided with a network of ducts for the supply of a viscous medium to a pattern of bearing grooves formed in the bearing. The ducts communicate with a reservoir which is exterior to the bearing, from which reservoir the viscous medium is forced into the groove of the bearing. However, this method of filling the bearing requires intricate and consequently expensive measures, so that for many uses this construction is not attractive.

A preferred embodiment of the invention is & characterized in that the pattern of feed grooves is formed in the first surface, the reservoir being constituted by a central recess which is formed in the second surface and which surrounds the axis of rotation. This construction is very interesting when the bearing is an end bearing or thrust bearing By means of simple constructional steps it is then possible to guarantee an optimum supply of viscous medium to the bearing grooves during operation. It is to be noted that this construction is not restricted to axial bearings of the said type.

A further preferred embodiment is characterized in that the reservoir is constituted by an annular recess which is formed in the second surface and which concentrically surrounds the pattern of bearing grooves. This construction may be employed both in the case of thrust bearings and axial bearings having a central opening for the passage of a shaft. This axial bearing in accordance with the invention can also be manufactured simply. During rotation of the surfaces relative to each other viscous medium is forced inwards from the annular reservoir in this bearing. A particularly favorable constructional step in order to realize the axial bearing in accordance with the invention described above is to form the recess by an annular element which is secured to one of the parts of the bearing, a lateral surface of the element functioning as part of the second surface at the location of the reservoir.

An optimum supply of viscous medium to the pattern of bearing grooves under operating conditions is guaranteed if the feed grooves are formed in the first surface and extend up to a circumferential edge of the reservoir, where & they adjoin the bearing grooves.

Another suitable embodiment, in which the first surface has two cooperating patterns of bearing grooves which act to build up oppositely directed pressures, is characterized in that the patterns of bearing grooves and the pattern of feed grooves together act to build up a positive pressure which at least at the outer portion of the bearing groove pattern, is directed towards the axis of rotation. In this way the loss of viscous medium is minimized without the use of additional provisions. The required resulting pressure build-up can be obtained by a suitable choice of the length, the depth, the width and/or the pitch angle of the bearing grooves. In the axial bearing in accordance with the present embodiment the two patterns of bearing grooves together form a fishbone pattern, the center lines of the bearing grooves themselves being straight, or curved. Suitably, the center lines of the bearing grooves are shaped as logarithmic spirals. Preferably, the feed grooves of the reservoir are shaped in conformity with the shape of the bearing grooves.

It is to be noted that the feed grooves as used in the axial bearing in accordance with the invention further perform an essential function, not mentioned above in starting, i.e. when the rotatable part is set into rotation relative to the stationary part of the bearing. This is because it is important that as soon as there is any relative movement between the surfaces of the bearing there amount of viscous medium between the surfaces is adequate to preclude wear as a result of contact between the surfaces. Contact between the surfaces may arise in the stationary condition of the bearing as a result of axial forces which act on the bearing and which force out the viscous medium present between the surfaces during rotation. The feed grooves ensure that as soon as a rotation in the direction for which the bearing has been designed is started viscous medium is pumped into the bearing grooves, so that very rapidly after starting pressure is built up in the bearing and a gap is formed between the surfaces.

BRIEF DESCRIPTION OF THE DRAWINGS

Embodiments of the invention will now be described in more detail, by way of example, with reference to the drawing, in which.

Figure 1:
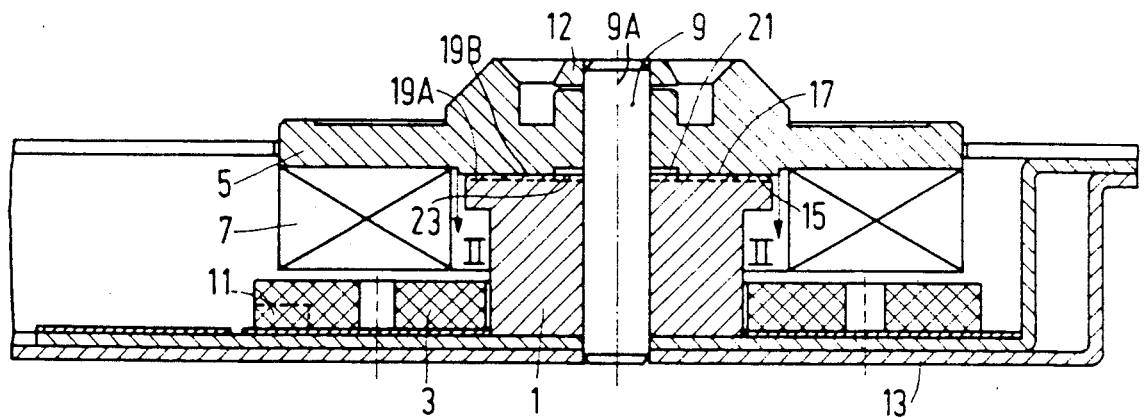
FIG. 1 is a sectional view of an electric motor employing an axial bearing in accordance with an embodiment of the invention.

The electric motor shown in FIG. 1 comprises a stator 1 with a plurality of, for example six, excitation coils 3, a rotor 5 with an annular axially magnetized multipole magnet 7 and a plurality of Hall element 11 for the electronic commutation of the excitation coils. The rotor 5 is constructed as a turntable for an optical disc, not shown, and is rotatable about a shaft 9 mounted in the stator. The stator 1 is secured to a frame 13 of an optical-disc player. The rotor 5 is axially retained on the shaft 9 by means of a ring 12.

Further, the electric motor comprises an axial bearing in accordance with the invention, comprising a first surface 15 and a second surface 17. The first surface 15 is situated on the stator 1 and is formed with two patterns of bearing grooves 19A and 19B, whose center lines suitably extend along logarithmic spirals, the patterns 19A and 19B together forming a fishbone pattern, for example as is & disclosed in the aforementioned Netherlands Patent Application 7,213,192. During operation, when the rotor 5 rotates relative to the stator about an axis of rotation 9A, a pressure is built up in a lubricant, such as grease, present in the bearing grooves, thereby providing a hydrodynamic lubrication.

The second surface 17, which is provided on the rotor 5, cooperates with said patterns of bearing grooves 19A and 19B and is formed with a recess 21. The recess 21 concentrically surrounds the shaft 9 and functions as a & reservoir containing a supply of lubricant. The part of the first surface 15 facing the recess 21 is formed with a pattern of feed grooves 23 which change into the bearing grooves 19B at the edge of the reservoir. Each groove 19B communicates with and is a smooth curve continuation of a groove 23. The feed grooves serve to pump lubricant into the bearing grooves 19B and 19A under operating conditions, i.e. when the rotor 5 is in rotation.

When the pattern of feed grooves 23 is suitably dimensioned with respect to the patterns of bearing grooves 19A and 19B it is possible to ensure that the bearing grooves 19A and 19B receive an optimum supply lubricant and also to build up a net inward pressure at the outer portion of the region swept by the grooves 19A, to prevent lubricant from being pumped out of the bearing. By way of example, in the bearing in accordance with the invention, the depth of the bearing grooves is selected to be 4 $\mu$m, the depth of the feed grooves is selected to be 40 $\mu$m, and the depth of the reservoir is selected to be 0.5 mm.

Figure 2:
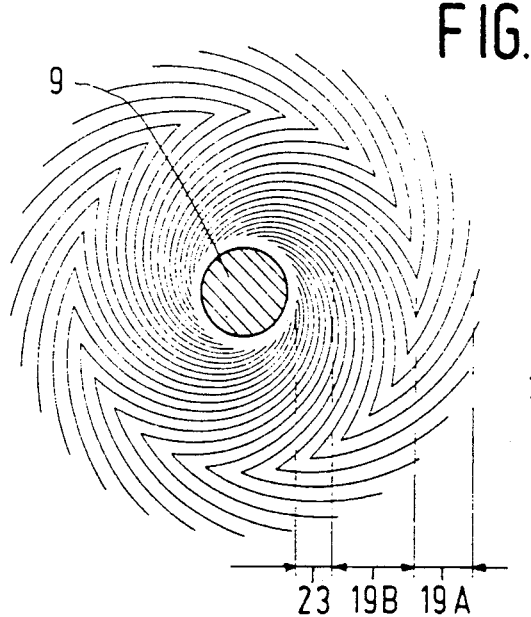
FIG. 2 is an enlarged-scale sectional view of the axial bearing, taken on the line II-II in FIG. 1, FIGS. 3, 4 and 5 show axial bearings in accordance with a second, a third, and a fourth embodiment of the invention.
Figure 3:
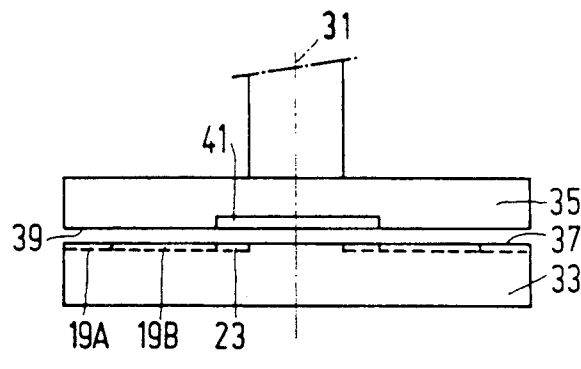

FIG. 3 shows schematically an axial bearing in accordance with a second embodiment of the invention in a slid-apart condition. The bearing, which is constructed as a thrust bearing, comprises two parts 33 and 35 which are rotatable relative to each other about an axis of rotation 31. The part 33 has a first surface 37 which, in the same way as shown in FIG. 2, is formed with two patterns of bearing grooves 19A and 19B and a pattern of feed grooves 23. The part 35 has a second surface 39 which cooperates with the first surface 37 and which is formed with a central recess 41 to form a lubricant reservoir.

Figure 4:
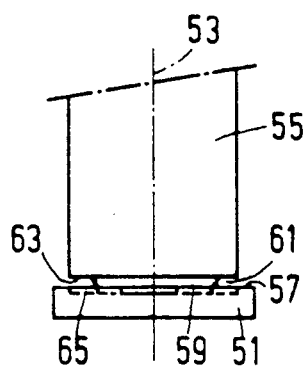

FIG. 4 shows the axial bearing in accordance with a third embodiment of the invention. This bearing comprises a part 51 and a part 55 which is rotatable relative to the first-mentioned part about an axis of rotation 53. The part 51 has a first surface 57 in which one pattern of spiral bearing grooves 59 is formed in a manner as described in, for example, Philips Technisch Tijdschrift, Volume 25, no.9, 1963, pp.296–316 (in particular FIG. 17), (herewith incorporated by reference). During rotation in the direction of rotation for which the bearing has been designed a pressure is built up in this bearing, which pressure increases from the outer edge of the pattern of bearing grooves towards the center of the bearing. In accordance with the invention the bearing is provided with a reservoir 61 for a lubricant. The reservoir 61 is formed by an annular recess in the second surface 63 of the part 55. The part of the surface 57 adjoining the reservoir 61 is formed with a pattern of feed grooves 65, which serve for pumping lubricant towards the pattern of bearing grooves 59.

Figure 5:
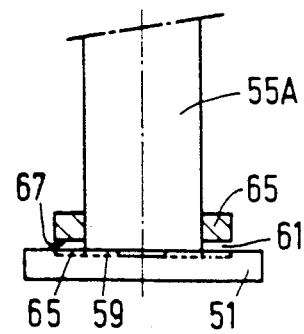

FIG. 5 shows a modification of the bearing shown in FIG. 4. The bearing shown in FIG. 5 comprises a part 51 which is similar to that in the bearing shown in the preceding Figure. The difference with the latter bearing resides in the manner in which the reservoir 61 for the lubricant is obtained. To form the reservoir 61 an annular element 65 is secured to the part 55A which cooperates with the part 51, a lateral surface 67 of the element 65 cooperating with the pattern of feed grooves in the facing part 51.

It is obvious that the scope of the invention is not limited to the embodiments described herein. For example, the bearing surfaces—referred to as first and second surfaces in the foregoing—need not always be flat. The bearing surfaces may alternatively be curved, for example spherical.

What is claimed is:

1. In an axial bearing of the type comprising two parts which are rotatable relative to each other about an axis of rotation, one of said parts comprising a first surface, and the other of said parts comprising a second surface facing the first surface to form a gap therebetween, said surfaces being coaxial with said axis of rotation; and said first surface being provided with a pattern of bearing grooves for building up pressure in a liquid lubricant present in said gap as the surfaces rotate relative to each other during bearing operation, the improvement comprising:

a reservoir for storing the liquid lubricant between the first surface and the second surface; and one of the surfaces comprises a pattern of feed grooves situated in an annular area at the location of the reservoir which is concentric with the axis of rotation for pumping the liquid lubricant from the reservoir toward the pattern of bearing grooves during bearing operation.

2. An axial bearing as claimed in claim 1, wherein the pattern of feed grooves is formed in the first surface, and the reservoir comprises a central recess which is formed in the second surface and which surrounds the axis of rotation, the reservoir having a circumferential edge defined by the intersection of said recess with said second surface.

3. An axial bearing as claimed in claim 2, wherein the feed grooves formed in the first surface extend outwardly to a position opposite the circumferential edge of the reservoir and adjoin the bearing grooves.

4. An axial bearing as claimed in claim 3, wherein the first surface comprises two cooperating patterns of bearing grooves which act to build up oppositely directed pressures, and the patterns of bearing grooves and the pattern of feed grooves together act to build up a positive pressure, at least at an outer portion of the bearing, which is directed towards the axis of rotation.

5. An axial bearing as claimed in claim 4, wherein said feed grooves have a depth which is substantially ten times the depth of the bearing grooves.

6. An axial bearing as claimed in claim 3, wherein each feed groove communicates with a respective bearing groove.

7. An axial bearing as claimed in claim 6, wherein each feed groove is a smoothly curving continuation of a respective bearing groove.

8. An axial bearing as claimed in claim 7, wherein said feed grooves have a depth of 40 μm, said bearing grooves have a depth of 4 μm and said reservoir has a depth of 5 mm.

9. An axial bearing as claimed in claim 6, wherein said feed grooves have a depth which is substantially ten times the depth of the bearing grooves.

10. An axial bearing as claimed in claim 2, the first surface having two cooperating patterns of bearing grooves which act to build up oppositely directed pressures, characterized in that the patterns of bearing grooves and the pattern of feed grooves together act to build up a positive pressure which is directed towards the axis of rotation.

11. An axial bearing as claimed in claim 2, wherein said feed grooves have a depth which is substantially ten times the depth of the bearing grooves.

12. An axial bearing as claimed in claim 1, characterized in that the reservoir is constituted by an annular recess which is formed in the second surface and which concentrically surrounds the pattern of bearing grooves.

13. An axial bearing as claimed in claim 12, the first surface having two cooperating patterns of bearing grooves which act to build up oppositely directed pressures, characterized in that the patterns of bearing grooves and the pattern of feed grooves together act to build up a positive pressure, at least at an outer portion of the bearing, which is directed towards the axis of rotation.

14. An axial bearing as claimed in claim 12, characterized in that the feed grooves are formed in the first surface and extend up to a circumferential edge of the reservoir, where they adjoin the bearing grooves.

15. An axial bearing as claimed in claim 14, the first surface having two cooperating patterns of bearing grooves which act to build up oppositely directed pressures, characterized in that the patterns of bearing grooves and the pattern of feed grooves together act to build up a positive pressure, at least at an outer portion of the bearing, which is directed towards the axis of rotation.

16. An axial bearing as claimed in claim 14, characterized in that each feed groove communicates with a respective bearing groove.

17. An axial bearing as claimed in claim 16, characterized in that each feed groove is a smoothly curving continuation of a respective bearing groove.

18. An axial bearing as claimed in claim 12, characterized in that the recess is formed by an annular element which is secured to one of the parts of the bearing, a lateral surface of the element functioning as part of the second surface at the location of the reservoir.

19. An axial bearing as claimed in claim 18, characterized in that the feed grooves are formed in the first surface and extend up to a circumferential edge of the reservoir, where they adjoin the bearing grooves.

20. An axial bearing as claimed in claim 19, the first surface having two cooperating patterns of bearing grooves which act to build up oppositely directed pressures, characterized in that the patterns of bearing grooves and the pattern of feed grooves together act to build up a positive pressure, at least at an outer portion of the bearing, which is directed towards the axis of rotation.

21. An axial bearing as claimed in claim 19, characterized in that each feed groove communicates with a respective bearing groove.

22. An axial bearing as claimed in claim 21, characterized in that each feed groove is a smoothly curving continuation of a respective bearing groove.

23. An axial bearing as claimed in claim 18, the first surface having two cooperating patterns of bearing grooves which act to build up oppositely directed pressures, characterized in that the patterns of bearing grooves and the pattern of feed grooves together act to build up a positive pressure, at least at an outer portion of the bearing, which is directed towards the axis of rotation.

24. An axial bearing as claimed in claim 1, the first surface having two cooperating patterns of bearing grooves which act to build up oppositely directed pressures, characterized in that the patterns of bearing grooves and the pattern of feed grooves together act to build up a positive pressure which is directed towards the axis of rotation.

25. An axial bearing as claimed in claim 1, wherein said feed grooves have a depth which is substantially ten times the depth of the bearing grooves.

26. An axial bearing, comprising:
(a) a first bearing part having a circular aperture and a first planar bearing surface transverse to said aperture;

(b) a second bearing part having a second planar bearing surface facing said first bearing surface and a shaft having a central axis transverse to said second bearing surface, said shaft extending into said aperture so that said first and second bearing parts are rotatable with respect to each other about said central axis, a liquid lubricant being present between said bearing surfaces during bearing operation;

said first bearing part comprising a reservoir for storing a liquid lubricant comprising an annular recess in said first bearing surface disposed around said aperture and facing said second bearing surface, the intersection of said recess and said first bearing surface defining a circular edge, a liquid lubricant being present in said reservoir during bearing operation, said second bearing part comprising bearing grooves disposed in an outer annular area forming a fishbone pattern for building pressure in said lubricant during bearing operation, and feed grooves disposed in an inner annular area adjoining said outer area for delivering lubricant present in said reservoir to said bearing grooves during bearing operation, said feed grooves extending outwardly from a position proximate said shaft to a position opposite said circular edge where each feed groove smoothly joins a respective bearing groove.

27. An axial bearing as claimed in claim 26, wherein said bearing grooves extend along logarithmic spirals forming said fishbone pattern.

28. An axial bearing as claimed in claim 27, wherein said feed grooves have a depth of 40 $\mu$m, said bearing grooves have a depth of 4 $\mu$m and said reservoir has a depth of 5 mm.

29. An axial bearing as claimed in claim 26, wherein said feed grooves have a depth which is substantially ten times the depth of the bearing grooves.

30. An axial bearing as claimed in claim 2, wherein said feed grooves have a depth of 40 $\mu$m, said bearing grooves have a depth of 4 $\mu$m and said reservoir has a depth of 5 mm.

* * * * *